UNITED STATES PATENT OFFICE.

LEWIS H. WITTE, OF CLEVELAND, OHIO.

PROCESS OF MANUFACTURE OF MILK-SUGAR.

SPECIFICATION forming part of Letters Patent No. 258,841, dated May 30, 1882.

Application filed October 10, 1878.

*To all whom it may concern:*

Be it known that I, LEWIS H. WITTE, of Cleveland, in the county of Cuyahoga and State of Ohio, have invented certain new and useful Improvements in Processes of Manufacture of Milk-Sugar; and I do hereby declare the following to be a full, clear, and exact description of the invention, such as will enable others skilled in the art to which it pertains to make and use it.

My invention relates to a process of manufacturing milk-sugar, and to a filter necessary in carrying out said process. This process consists in the construction of a novel filter especially designed for the clarification of whey used in the manufacture of milk-sugar, said whey being rendered turbid by the coagulation of caseous or albuminous matter that has not been removed in the manufacture of cheese.

In the manufacture of cheese about four-fifths of the caseous matter is coagulated by the rennet used. The other fifth remains in solution in the whey, even when the neutral or non-acid solution is heated to boiling. When, however, the solution is rendered acid then the caseous matter is coagulated upon heating to the boiling-point. This coagulum is insoluble in an alkaline solution. Hence it differs from normal caesine, which coagulates upon heating an acidified solution, but which redissolves upon addition of an alkali.

In the manufacture of milk-sugar it is a matter of great importance to free the whey of caseous or albuminous matter, as then it can be evaporated to a smaller bulk than it can when containing caseous or albuminous matter, which renders the whey thick or sirupy, and less adapted for proper crystallization. A proper crystallization favors a purification of the milk-sugar sought for. The evaporation to a smaller bulk allows a greater yield of milk-sugar.

Heretofore the caseous or albuminous matter has been very imperfectly removed in the process of the manufacture of milk-sugar previous to the steps taken for removing the milk-sugar retained. This imperfect removal was due, in the first place, to the want of acid necessary to coagulate it, or to the want of lime or other alkaline earth or salt thereof to form an insoluble combination with it. There being, however, a small amount of acid present due to souring, a small portion of the caseous or albuminous matter was coagulated. The caseous or albuminous matter that actually was coagulated was very imperfectly removed by means of subsidence, or by straining through skimmers or other strainers. The removal of the coagulated caseous or albuminous matter by subsidence is very imperfect when large quantities of whey are operated upon, by reason of currents kept up during the cooling of the whey, and when sufficient time was allowed for perfect subsidence the milk-sugar in it would by souring become lost, or so nearly lost as to be un-profitable to operate further. Removal of the coagulated caseous or albuminous matter by straining or by skimming is very imperfect, because only a small proportion of the coagulated matter exists in aggregations large enough to be retained by the skimmer or by the strainer.

For the perfect separation of the coagulated caseous or albuminous matter from the whey I have devised a novel filter, consisting of a layer of the coagulated caseous or albuminous matter itself, or of a combination of the caseous or albuminous matter with lime or some other earth. This filtering-layer is easily formed by passing whey containing the matter B through a cloth, A, able to retain the coarser particles or the larger aggregations. When the entire straining surface is thus covered the whey filters through perfectly cleansed of any floating impurities. The impure whey first passed through may then be passed through again for more complete filtration.

The cloth A, upon which to form the filtering-layer B, I prefer should be of cotton, because inexpensive, and it should be woven closely in order to form a good support to the filtering-layer B. I find that every square yard of such layer will pass through about two hundred pounds of whey per hour. The cloth may be suspended in any suitable manner. A good way is to make it into bags and suspend them in vessels to protect them from disturbance, and allowing the filtrate to run out at the bottom in such vessels. A number of such bags may be suspended in one vessel and connected by conducting-pipes with one common vessel through which to fill all. They may then be kept full without necessity of disturbing the filtering-layer B.

I coagulate the caseous or albuminous matter by adding some acid (preferably muriatic acid) to the whey and then heating to the boiling-point. I have found the following proportion of muriatic acid to yield an effective purpose, viz: one and one-half (1½) pint muriatic acid at 18° to one thousand (1,000) pounds of whey. The filtering-layer being an aggregation of minute particles with minute spaces between, it allows the liquor of the whey to drain through, but holds all floating particles, they being larger than the spaces in the filtering-layer. The spaces being innumerable, a large quantity of liquor is able to drain through.

What I claim is—

1. A process in the manufacture of milk-sugar, consisting in filtering whey through caseous or albuminous matter, substantially as and for the purpose shown.

2. As a process in the manufacture of milk-sugar, a treatment of whey consisting of the application of acid and heat, substantially as and for the purpose shown.

3. A filter for purifying whey in the process of making milk-sugar, consisting of an envelope of fabric having an internal layer or lining of caseous or albuminous matter, substantially as and for the purpose shown.

4. As an article of manufacture, milk-sugar made according to the process herein specified, substantially as shown.

5. The combination of whey and muriatic acid, substantially as shown.

6. One, two, or more filters, A B, in combination with suitable apparatus for feeding to and collecting from them, substantially as and for the purpose shown.

7. The process of preparing whey for the manufacture of milk-sugar, consisting in the scalding and filtering of the whey, substantially as and for the purpose described.

In testimony whereof I have signed my name to this specification in the presence of two subscribing witnesses.

LEWIS H. WITTE.

Witnesses:
JNO. CROWELL, Jr.,
WILLARD FRACKER.